United States Patent [19]

Katsuda et al.

[11] Patent Number: 5,400,268
[45] Date of Patent: Mar. 21, 1995

[54] VEHICLE SPEED DETERMINING DEVICE HAVING MEANS FOR ACCURATE DETERMINATION OF ZEROING OF VEHICLE SPEED

[75] Inventors: Toshihiro Katsuda, Toyota; Shinji Sekido, Okazaki; Setsuo Tokoro, Toyota; Tatsuo Kyushima, Okazaki; Masaharu Tanaka, Toyota, all of Japan

[73] Assignee: Toyota Jidosha Kabushiki Kaisha, Toyota, Japan

[21] Appl. No.: 963,635

[22] Filed: Oct. 20, 1992

[30] Foreign Application Priority Data

Oct. 25, 1991 [JP] Japan .................. 3-306773

[51] Int. Cl.$^6$ ................ G01P 3/00; G01P 3/50
[52] U.S. Cl. ................ 364/565; 364/424.1; 364/426.04
[58] Field of Search ........ 364/565, 569, 424.1, 364/426.04, 426.05, 431.11, 494, 431.04, 424.03; 324/160, 161; 123/414; 318/703

[56] References Cited

U.S. PATENT DOCUMENTS

| 4,028,532 | 7/1977 | Reuther ................. 364/494 |
| 4,176,337 | 11/1979 | Aechter et al. ........... 364/569 X |
| 4,441,062 | 4/1984 | Evans et al. ............. 318/703 |
| 4,648,104 | 3/1987 | Yachida et al. ........... 364/565 X |
| 4,669,046 | 5/1987 | Kubo .................... 364/426 |
| 4,670,852 | 6/1987 | Masaki et al. ............ 364/565 |
| 4,718,013 | 1/1988 | Kubo .................... 364/426 |
| 4,734,861 | 3/1988 | Bertolasi et al. ........ 364/569 X |
| 4,788,956 | 12/1988 | Suzuki et al. ............ 123/414 |
| 4,918,606 | 4/1990 | Ito et al. ............... 364/424.1 |
| 4,924,420 | 5/1990 | Hadley et al. ............ 364/569 |
| 4,931,940 | 6/1990 | Ogawa et al. ............. 364/431.03 |

FOREIGN PATENT DOCUMENTS

| 59-210369 | 11/1984 | Japan . |
| 59-210370 | 11/1984 | Japan . |
| 59-210371 | 11/1984 | Japan . |
| 59-210374 | 11/1984 | Japan . |

*Primary Examiner*—Emanuel T. Voeltz
*Assistant Examiner*—M. A. Kemper
*Attorney, Agent, or Firm*—Oblon, Spivak, McClelland, Maier, Neustadt

[57] ABSTRACT

A vehicle speed determining device determines a running speed of a vehicle, on the basis of pulses received from a vehicle speed sensor. A first determination that the running speed of the vehicle has been zeroed is made, if a next pulse has not been received from the sensor, within a predetermined first length of time after the reception of a last pulse from the sensor. A second determination that a period of the next pulse to be received next is abnormally long is made, if said next pulse has not been received within a predetermined second length of time after the reception of the last pulse. If the second determination is made, the first determination is inhibited until the next pulse has been received.

10 Claims, 4 Drawing Sheets

VEHICLE SPEED DETERMINING DEVICE HAVING MEANS FOR ACCURATE DETERMINATION OF ZEROING OF VEHICLE SPEED

BACKGROUND OF THE INVENTION

1. Field of the Invention

The present invention relates to a device for determining the running speed of a vehicle, on the basis of a pulse signal generated from a vehicle speed sensor.

2. Discussion of the Related Art

In the art of controlling the shifting of an automatic transmission of a motor vehicle, there has been used a device for calculating the running speed of the vehicle, from pulses which are generated by a speed sensor in response to the rotation of a rotating member whose speed changes with the speed of drive wheels of the vehicle. More specifically, since the period of the pulses changes with the actual vehicle speed, the actual vehicle speed can be calculated from time to time, on the basis of the detected periods of the successive pulses. In this type of known vehicle speed calculating device, a difference between the periods of the received two successive pulses may exceed a given limit, in the event of a trouble with the device, for example, electrical failure such as discontinuity of signal lines or poor contacts of connectors between the sensor and the device. If one or more pulses were missing due to such electrical failure during a time length between the actually generated and received two successive pulses, the period of the last received pulse (currently detected pulse) would differ from that of the preceding pulse (pulse received in the preceding calculation cycle), by an abnormally large amount, namely, by a difference larger than a given threshold. In this abnormal case, the last received pulse is ignored, and the period of the preceding pulse is stored as the period of the last received pulse. The vehicle speed is calculated from the stored periods of the successive pulses, which include the last pulse whose period is replaced by that of the preceding pulse in the abnormal case indicated above. Examples of such vehicle speed calculating device are disclosed in laid-open Publications JP-A-59-210369, JP-A-59-210370, JP-A-59-210371 and JP-A-59-210374 (publications of unexamined Japanese Patent Applications) and U.S. Pat. No. 4,718,013.

As indicated above, the vehicle speed is calculated on the basis of a predetermined number of stored successive pulses including the last pulse. That is, a moving average of the stored periods of the predetermined number of the successive pulses is used to calculate the vehicle speed. Accordingly, the vehicle speed calculated on the basis of the above average will not be zeroed or almost zeroed as soon as the actual vehicle speed has been zeroed. Consequently, the automatic transmission which is shifted depending upon the calculated vehicle speed may not be sufficiently shifted down when the vehicle is suddenly stopped with abrupt brake application, for instance. In this case, the stopped vehicle cannot be re-started with a sufficient drive force being transmitted to the drive wheels from the transmission.

For improving the known vehicle speed calculating device, it is considered to provide the device with means for determining that the vehicle speed is zero, if a pulse has not been received from the vehicle speed sensor, for a time duration exceeding a predetermined threshold. This arrangement permits the transmission to be sufficiently shifted down upon stopping of the vehicle with abrupt brake application. However, the same arrangement causes the determination of zeroing of the vehicle speed, even in the event that the device does not receive pulses from the sensor, due to poor contact of the connector or discontinuity of the signal lines, for example, while the vehicle is in fact running at a certain speed well above the zero level. In this case, the transmission may be unexpectedly and undesirably shifted down even though the vehicle is running at a relatively high speed.

SUMMARY OF THE INVENTION

It is therefore an object of the present invention to provide a vehicle speed determining device capable of determining the running speed of the vehicle with high accuracy and reliability.

The above object may be achieved according to the principle of the present invention, which provides a vehicle speed determining device for determining a running speed of a vehicle, on the basis of pulses received from a vehicle speed sensor, comprising: (a) first determining means for making a first determination that the running speed of the vehicle has been zeroed, if a predetermined first length of time has elapsed after the reception of a last pulse from the vehicle speed sensor, without the reception of a next pulse; (b) second determining means for making a second determination that a period of the next pulse to be received next is abnormally long, if a predetermined second length of time has elapsed after the reception of the last pulse, without the reception of the next pulse; and (c) inhibiting means for inhibiting the first determining means from making the first determination until the next pulse has been received, if the second determining means has made the second determination.

In the vehicle speed determining device of the present invention constructed as described above, the first determination that the vehicle speed has been almost zeroed is made if the next pulse has not been received from the vehicle speed sensor, within the predetermined first length of time after the reception of the last pulse. That is, the elapse of the first length of time means that the period of the next pulse is longer than the first length of time, which corresponds to the period of the pulse produced when the actual vehicle speed is almost zero. This arrangement makes it possible to make the first determination as soon as the actual vehicle speed has been almost zeroed, and permits an automatic transmission of the vehicle to be shifted down to a suitable low-gear position upon abrupt stopping of the vehicle, if the present device is used for a controller for controlling the transmission.

The next pulse may not be received within the predetermined first length of time, under some abnormal conditions, for example, if two or more pulses were not received due to poor contact of connectors between the sensor and the signal lines. In this case, the first determination is erroneously made even when the vehicle speed is not almost zero, that is, even while the vehicle is running at a relatively high speed. To avoid this drawback, the second determining means is provided to determine whether the period of the pulse to be received next is abnormally long or not, namely, to determine whether or not the predetermined second length of time longer than the first length of time has elapsed after the reception of the last pulse, without the reception of the next pulse. The elapse of the second length of time means that one or more pulses which should be normally received is/are missing after the reception of the last pulse, and does not mean that the vehicle speed is almost zero. In this case, the inhibiting means inhibits the first determining means from making the first determination that the vehicle speed has been almost zeroed. This inhibition continues until the next pulse is received. Therefore, the present arrangement does not cause an erroneous determination of zeroing of the actual vehicle speed, and prevents undesired shift-down operation of the vehicle transmission, in the event of some trouble associated with the vehicle speed sensor, while the vehicle is running at a relatively high speed.

BRIEF DESCRIPTION OF THE DRAWINGS

The above and other objects, features and advantages of the present invention will be become more apparent by reading the following detailed description of a presently preferred embodiment of the invention, when considered in connection with the accompanying drawings, in which.

DETAILED DESCRIPTION OF THE PREFERRED EMBODIMENT

Figure 1:
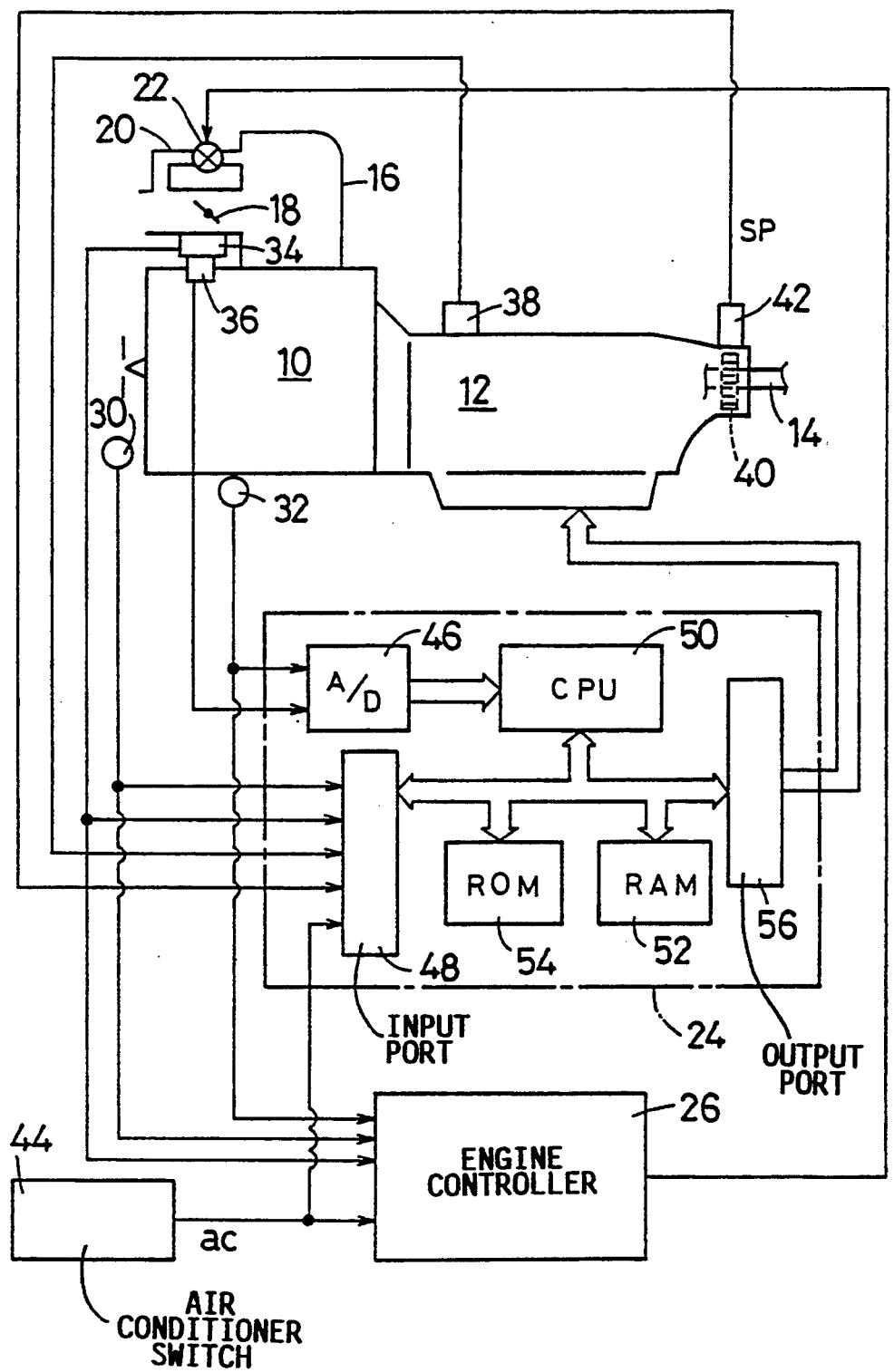
FIG. 1 is a schematic view of a vehicle power transmission system, and a control apparatus for the system, which includes a transmission shift controller incorporating one embodiment of the present invention; a vehicle speed determining device constructed according to FIG. 2 is a flow chart illustrating an interruption routine executed by the vehicle speed determining device, for processing vehicle speed pulses SP received from a vehicle speed sensor.

Referring first to FIG. 1, there are schematically shown a power transmission system for a motor vehicle, and a control apparatus therefor. In the figure, reference numeral 10 denotes an engine whose output is transmitted to a pair of drive wheels of the vehicle, through an automatic transmission 12, a propeller shaft 14 and a reduction gear device, as well known in the art. Within an intake pipe 16 of the engine 10, there are disposed a throttle valve 18 linked with an accelerator pedal, a by-pass passage 20 which by-passes the throttle valve 18, and an idling-speed adjusting valve 22 which is adapted to change the rate of an air flow through the by-pass passage 20, for thereby adjusting the idling speed of the engine 10.

The automatic transmission 12 is a well known planetary gear transmission incorporating a torque converter equipped with a lock-up clutch. The transmission has a plurality of hydraulically operated frictional coupling devices which are operated to selectively establish a plurality of gear positions.

The control apparatus includes a microcomputer which functions as a transmission shift controller 24 for controlling the automatic transmission 12, and a microcomputer which functions as an engine controller 26 for controlling the engine 10. The controllers 24, 26 are adapted to receive various signals from various sensors and switches, such as an engine speed sensor 30, a coolant temperature sensor 32, an IDLE POSITION switch 34, a throttle sensor 36, a SHIFT POSITION sensor 38, a vehicle speed sensor 42, and an AIR CONDITIONER switch 44. The engine speed sensor 30 generates a signal indicative of the speed of the engine 10, which is received by the controllers 24, 26. The coolant temperature sensor 32 generates a signal indicative of the temperature of a coolant for cooling the engine 10, which is also received by the controllers 24, 26. The IDLE POSITION switch 34 generates a signal indicating that the throttle valve 18 is in an engine idling position for idling the engine 10. This signal is also received by the two controllers 24, 26. The throttle sensor 36 generates a signal indicative of the opening angle of the throttle valve 18 in the intake pipe 16. The SHIFT POSITION sensor 38 generates a signal indicative of the currently selected position of the transmission 12. The vehicle speed sensor 42 generates a vehicle speed signal in the form of VEHICLE SPEED pulses SP indicative of the rotating speed of the output shaft of the transmission 12 (propeller shaft 14). The output signals of the sensors 36, 38 and 42 are received by the transmission shift controller 24 only. The transmission 12 is provided with a toothed magnet ring 40 rotating with the output shaft, and the vehicle speed sensor 42 includes a magnetic resistor element for detecting the passage of the teeth of the ring 40. The pulses SP may be shaped by a suitable shaping circuit, before they are received by the controller 24. The AIR CONDITIONER switch 44 is operated manually or automatically to turn on and off an air conditioner of the vehicle, and generates an output signal indicative of whether the air conditioner is on or off.

The microcomputer of the transmission shift controller 24 includes an analog/digital (A/D) converter 46, an input port 48, a central processing unit (CPU) 50, a random-access memory (RAM) 52, a read-only memory (ROM) 54, and an output port 56. The CPU 50 operates to process the received input data according to control programs stored in the ROM 54, while utilizing a temporary data storage function of the RAM 52. As a result of the data processing operation, a shift command for shifting the automatic transmission 12 is fed through the output port 56 to the appropriate frictional coupling devices of the transmission 12. Generally, the transmission shift controller 24 is adapted to select one of a plurality of shift control patterns stored in the ROM 54, which corresponds to the currently selected position of the transmission 12 indicated by the signal of the SHIFT POSITION sensor 38. Each of the shift control pattern consists of a shift-up boundary line and a shift-down boundary line, which are predetermined relationships between the opening angle $\theta$ of the throttle valve 18 and the vehicle running speed. The gear position to which the transmission 12 is shifted is determined according to the selected shift control pattern, and on the basis of the actual throttle opening angle $\theta$ represented by the output of the throttle sensor 36, and the actual vehicle speed SPD calculated from the pulses SP of the vehicle speed sensor 42. The shift command to be fed to the frictional coupling devices is determined depending upon the thus determined gear position to which the transmission 12 is shifted from the current position.

The engine controller 26 will be briefly described, because the understanding of this controller 26 is not essential to the understanding of the present invention. When the received output of the IDLE POSITION switch 34 indicates that the throttle valve 18 is in the idling position, the controller 26 activates the idling-speed adjusting valve 22 so that the speed Ne of the engine 10 at that time, i.e., the idling engine speed Ne detected by the engine speed sensor 30 coincides with a desired or target speed which is stored for each of different operating and running conditions of the engine 10 and the vehicle. For instance, if the temperature of the engine coolant detected by the coolant temperature sensor 32 is lower than required, which means a need for warming up the engine 10, or if the load on the engine 10 is increased upon activation of the air conditioner detected by the switch 44, the idling-speed adjusting valve 22 is operated to increase the idling engine speed Ne, up to the target level which is determined for warming up the engine 10 or increasing the idling torque of the engine to operate the compressor of the air conditioner.

Referring to the flow charts of FIGS. 2 and 3, there will be described an operation of the transmission shift controller 24, which incorporates one embodiment of the vehicle speed determining device of the present invention.

Figure 2:
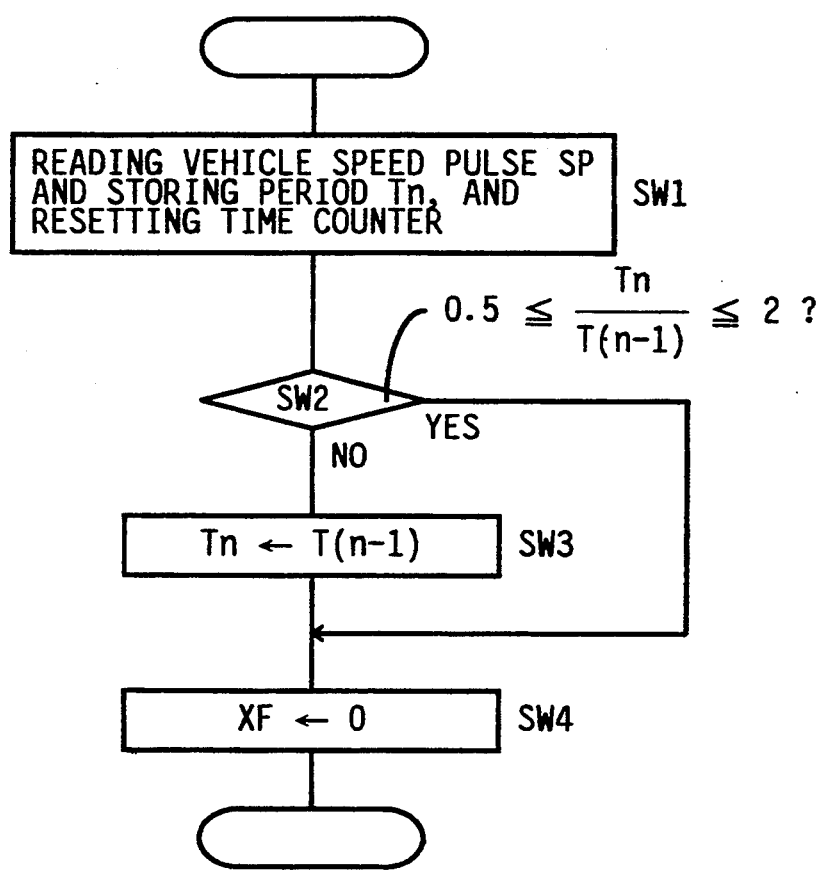

An interruption routine of FIG. 2 is executed each time the VEHICLE SPEED pulse SP is received from the vehicle speed sensor 42. This routine is started with step SW1 to store the content of a time counter provided in the CPU 50, when the present pulse SP falls. More specifically, the time counter is reset or re-started upon falling of each received pulse SP, and the content of the time counter at this time which represents the period Tn of the present pulse SP is stored. The time counter is re-started to start counting the period $T(n+1)$ of the next pulse SP. Thus, the period Tn stored in the RAM 52 is a time duration between the falls of the two successive pulses SP. Step SW1 is followed by step SW2 to determine whether the ratio $Tn/T(n-1)$ is held within a range between 0.5 (inclusive) and 2 (inclusive), where Tn represents the period of the last pulse SP (stored in the present cycle), while $T(n-1)$ represents the period of the preceding pulse SP (stored in the preceding cycle). If the ratio $Tn/T(n-1)$ is held within the specified range, the control flow goes to step SW4, skipping step SW3. In step SW4, an INHIBIT flag XF is reset to "0". If a negative decision (NO) is obtained in step SW2, namely, if the ratio is not within the specified range, step SW2 is followed by step SW3 in which the stored period Tn of the last pulse SP is changed to the period $T(n-1)$ of the preceding pulse SP. Step SW3 is followed by step SW4 to reset the INHIBIT flag XF to "0". This flag is used to inhibit execution of steps S3–S5 for a given length of time in a vehicle speed determining routine of FIG. 3, which will be described.

Figure 3:
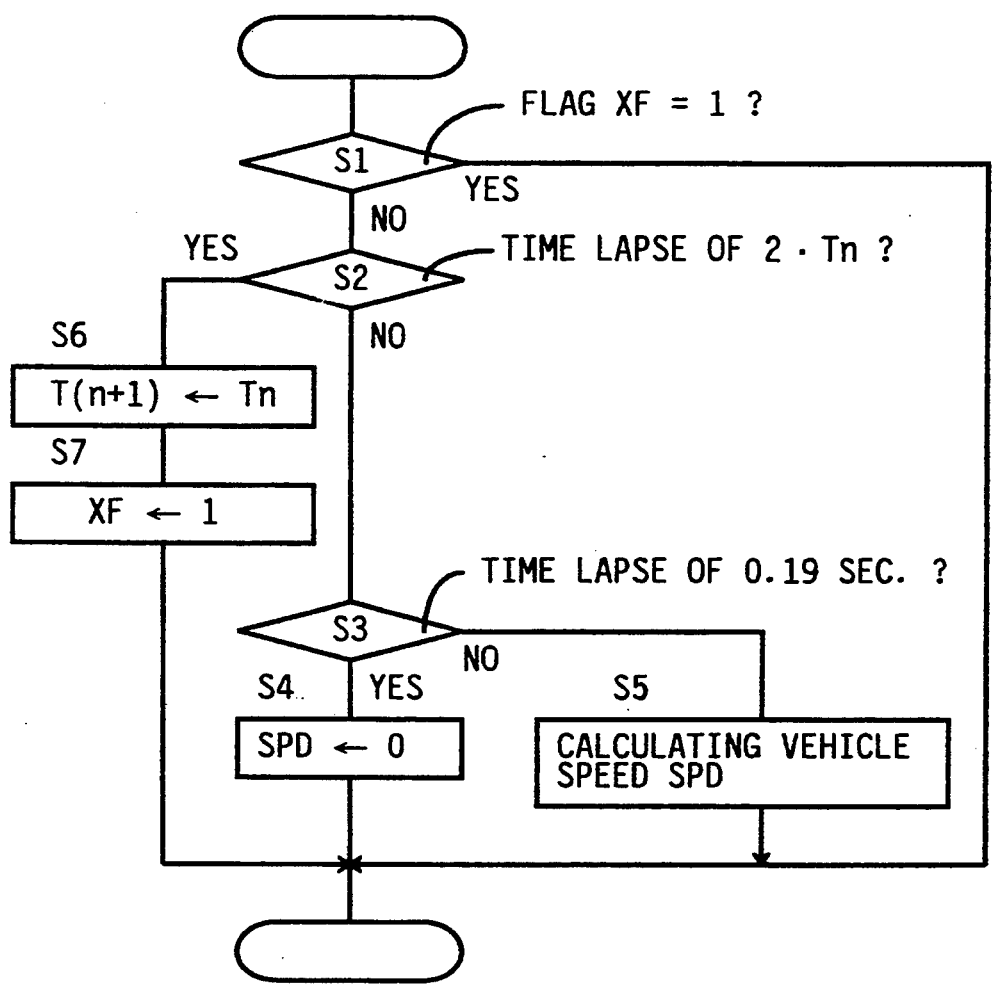
FIG. 3 is a flow chart illustrating an operation of a control routine executed by the vehicle speed determining device.

The vehicle speed determining routine of FIG. 3 is started with step S1 to determine whether or not the INHIBIT flag XF is set at "1". Normally, the flag XF is set at "0" since the flag XF is reset in step SW4 of the interruption routine of FIG. 2. In this case, step S2 is implemented to determine whether or not the vehicle speed has been lowered at an abnormally high rate. This determination is effected by checking if the current content of the time counter which is measuring the period $T(n+1)$ of the next pulse SP has exceeded a predetermined threshold, for example, a time length corresponding to 2·Tn. An affirmative decision (YES) is obtained in step S2 if the time length equal to two times the period Tn of the pulse SP (last stored in the RAM 52) has elapsed after the fall of the period Tn. If this time length has passed, this means that the next pulse SP has not been received within the time period 2·Tn, which in turn means an abnormally sudden decrease in the vehicle speed, which would not occur unless two or more successive pulses SP were missing, as indicated by dashed lines in FIG. 4, in the event of a trouble with the vehicle speed sensor 42 and/or the associated components.

Normally, a negative decision (NO) is obtained in step S2 even if the vehicle is considerably decelerated, or even when the vehicle is abruptly stopped. Accordingly, the control flow usually goes to step S3 to determine whether a predetermined time has elapsed after the fall of the last received pulse SP whose period Tn is stored in the RAM 52. In the present embodiment, step S3 is adapted to determine whether 0.19 sec. has passed or not. The elapse of this time length of 0.19 sec. means that the period of the pulse SP to be received next is larger than 0.19 sec., which is long enough to determine that the actual vehicle speed is substantially or almost zeroed (0 km/h). The time 2·Tn when the actual vehicle speed is almost zero is considerably longer than 0.19 sec., or conversely, the length of time of 0.19 sec. is considerably shorter than 2·Tn, when the vehicle speed is almost zero. Therefore, an affirmative decision (YES) is obtained in step S3 while a negative decision (NO) is obtained in step S2, when the actual vehicle speed is almost zeroed, with the period of the last pulse SP exceeding 0.19 sec. In this case, step S4 is implemented to determine that the actual vehicle speed SPD is zero, and this determination is used for controlling the automatic transmission 12. If the time length of 0.19 sec. has not elapsed, a negative decision (NO) is obtained in step S3, the control flow goes to step S5 in which the actual vehicle speed SPD (km/h) is calculated according to the following equation:

$$SPD = k \cdot 60 / \{T(n-3) + T(n-2) + T(n-1) + Tn\}$$

In the above equation, k represents a constant determined by the speed reduction ratio of the final reduction gear of the transmission system, and the effective radius of the drive wheels.

If the negative decision (NO) is obtained in step S2, one cycle of execution of the vehicle speed determining routine of FIG. 3 is terminated upon completion of step S4 or S5.

It will be understood from the explanation of step S3 that the determination of zeroing of the actual vehicle speed SPD is effected when the next pulse SP has not been received within the time length of 0.19 sec. after the fall of the last received pulse SP whose period is Tn. Consequently, the above determination is made as soon as the actual vehicle speed is almost zeroed, with the expected period $T(n+1)$ of the next pulse SP being long enough to indicate the stopping of the vehicle. This arrangement permits the transmission shift controller 24 to shift down the transmission 12 upon stopping of the vehicle with brake application.

If steps S3 and S4 were not provided, the determination of zeroing of the vehicle speed SPD should be made according to the above equation used in step S5, which uses the sum of the periods of the four successive pulses SP. The vehicle speed SPD calculated according to this equation cannot be zeroed when the period Tn of the last received pulse SP is sufficiently long (e.g., 0.19 sec.), namely, cannot be zeroed even if the actual vehicle speed SPD is substantially zeroed.

If an affirmative decision (YES) is obtained in step S2, this means that two successive pulses SP were missing in the event of any trouble associated with the vehicle speed sensor 42. In this abnormal case, step S6 is implemented to store the period Tn of the last received pulse SP as the period T(n+1) of an imaginary pulse. Step S6 is followed by step S7 in which the INHIBIT flag XF is set to "1", and one cycle of execution of the vehicle speed determining routine is terminated.

Figure 4:
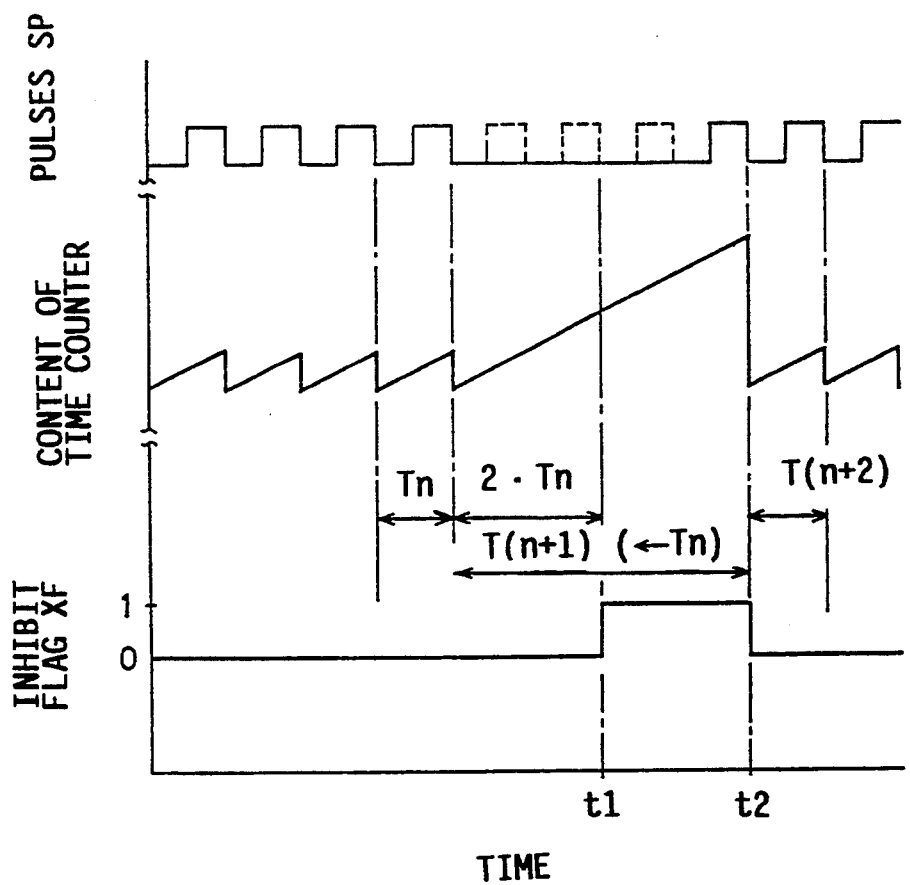
FIG. 4 is a time chart illustrating a change in the count of a time counter used in the vehicle speed determining apparatus.

In the case where the flag XF is set to "1" as indicated at t1 in FIG. 4, in the event of missing of two or more pulses SP due to some trouble with the sensor 42, an affirmative decision (YES) is obtained in step S1 of the present vehicle speed determining routine, until the flag XF is reset to "0" in step SW4 in the next execution of the interruption routine of FIG. 2, that is, until the next pulse SP is actually received as indicated at t2 in FIG. 4. Since the apparent period T(n+1) of this pulse SP as indicated in FIG. 4 (as stored in step SW1) is longer than 2·Tn, the period Tn of the preceding pulse SP is substituted for the period T(n+1), as indicated in FIG. 4, in step SW3. Therefore, in the next cycle of execution of the vehicle speed determining routine of FIG. 3, the actual vehicle speed SPD is calculated in step S5, on the basis of the periods of the four successive pulses SP, which includes the last two last periods Tn.

If steps S2, S6 and S7 were not provided, an affirmative decision (YES) would be obtained in step S3, resulting in an erroneous determination that the actual vehicle speed is zeroed, if three pulses SP were missing between the two actually received pulses SP, as in the example of FIG. 4 in which the missing pulses SP are indicated by dashed lines. In the present arrangement as illustrated in FIG. 3, however, the execution of steps S3–S5 is inhibited if the missing of such pulses SP is detected by the execution of step S2, namely, if the time corresponding to 2·Tn has passed after the fall of the last received pulse SP, as indicated at t1, at which the INHIBIT flag XF is set to "1" in step S7 as a result of an affirmative decision (YES) in step S2. It will therefore be understood that the provision of steps S2, S6 and S7 prevents the erroneous determination of zeroing of the vehicle speed SPD in step S3, while the vehicle is in fact running at a relatively high speed, with the period Tn being shorter than 0.19 sec. Therefore, the present embodiment is capable of accurately determining the actual vehicle speed SPD with high reliability, preventing an unexpected and undesirable shift-down action of the automatic transmission 12, in the event of missing of the pulses SP due to electrical failure such as discontinuity of signal lines, poor contacts of the connectors between the vehicle speed sensor 42 and the controller 24, while the vehicle is running.

While the present invention has been described above in its presently preferred embodiment, it is to be understood that the invention is not limited to the details of the illustrated embodiment, but may be otherwise embodied.

For instance, step S2 for determining whether or not the time length of 2·Tn has elapsed may be modified to use other threshold values of time length, for example, 3·Tn.

In the illustrated embodiment, the INHIBIT flag XF which is set to "1" in step S7 of the routine of FIG. 3 is reset to "0" when the interruption routine of FIG. 2 is next executed, that is, when the next pulse SP is received (more precisely, when the next pulse SP falls, as indicated at t2 in FIG. 4). However, the flag XF may be reset when a further condition or conditions is/are satisfied, for example, when the locking of the vehicle wheel or wheels is eliminated upon releasing of brake application, or when a suitable length of time has passed after the fall of the next pulse SP, i.e., after the point of time t2.

The vehicle speed sensor 42 used in the illustrated embodiment employs a magnetic resistor element for detecting the rotating speed of the magnet ring 40 which rotates with the output shaft of the automatic transmission 12. However, the sensor 42 may be replaced by a photoelectric type speed sensor, or may be adapted to detect the rotating speed of any other rotating member such as a wheel of the vehicle, or a drive axle or other members whose speed change with the speed of the vehicle body.

Although the present invention as applied to the vehicle speed sensor 42 used by the controller 24 for controlling the transmission 12, the principle of the invention is equally applicable to any other vehicle speed sensor used for other control purposes.

It is to be understood that the invention may be embodied with various other changes, modifications and advantages, which may occur to those skilled in the art, in the light of the foregoing teachings, without departing from the spirit and scope of the invention defined in the following claims.

What is claimed is:

1. A vehicle speed determining device for determining a zeroed running speed of a vehicle, on the basis of pulses received from a vehicle speed sensor, comprising:

first determining means for receiving pulses from said vehicle speed sensor and for making a first determination that said running speed of the vehicle has been zeroed when a predetermined first length of time has elapsed after the reception of a last pulse from said vehicle speed sensor, without the reception of a next pulse;

second determining means for making a second determination that a period of said next pulse is abnormally long when a predetermined second length of time longer than said predetermined first length of time has elapsed after the reception of said last pulse, without the reception of said next pulse; and inhibiting means for inhibiting said first determining means from making said first determination that the running speed of the vehicle has been zeroed until said next pulse has been received when said second determining means has made said second determination.

2. A vehicle speed determining device according to claim 1, wherein said predetermined first length of time is selected to be the period of said next pulse, which period indicates that said running speed of the vehicle has been almost zeroed.

3. A vehicle speed determining device according to claim 2, wherein said predetermined second length of time is larger than said predetermined first length of time.

4. A vehicle speed determining device according to claim 2, wherein said predetermined second length of time is at least two times a period of said last pulse.

5. A vehicle speed determining device according to claim 1, wherein said first and second determining means include a time counter for measuring a period of each of said pulses received from said vehicle speed sensor.

6. A vehicle speed determining device according to claim 5, wherein said time counter measures a time interval between falling edges of the two successive pulses.

7. A vehicle speed determining device according to claim 1, further comprising means for substituting a period of said last pulse for the period of said next pulse, if said second determining means has made said second determination.

8. A vehicle speed determining device according to claim 1, further comprising third determining means for making a third determination that a ratio of the period of said next pulse to a period of said last pulse exceeds a predetermined threshold, and means for substituting the period of said last pulse for the period of said next pulse, if said third determining means has made said third determination.

9. A vehicle speed determining device according to claim 1, further comprising speed calculating means for calculating the running speed of the vehicle, on the basis of a moving average of the periods of a plurality of successive pulses which includes the last pulse.

10. A controller for controlling an automatic transmission of a motor vehicle, including a vehicle speed determining device for determining a zeroed running speed of a vehicle, on the basis of pulses received from a vehicle speed sensor, comprising:
  first determining means for receiving pulses from said vehicle speed sensor and for making a first determination that said running speed of the vehicle has been zeroed when a predetermined first length of time has elasped after the reception of a last pulse from said vehicle speed sensor, without the reception of a next pulse;
  second determining means for making a second determination that a period of said next pulse is abnormally long when a predetermined second length of time longer than said predetermined first length of time has elapsed after the reception of said last pulse, without the reception of said next pulse;
  inhibiting means for inhibiting said first determining means for making said first determination that the running speed of the vehicle has been zeroed until said next means for making said first determination until said next pulse has been received when said second determining means has made said second determination; and
  means for outputting a signal to the transmission to shift the transmission as a function of said running speed determined by said first determining means.

* * * * *